Aug. 2, 1938.   M. P. YOUKER   2,125,325
VACUUM DISTILLATION PROCESS
Filed Feb. 25, 1930
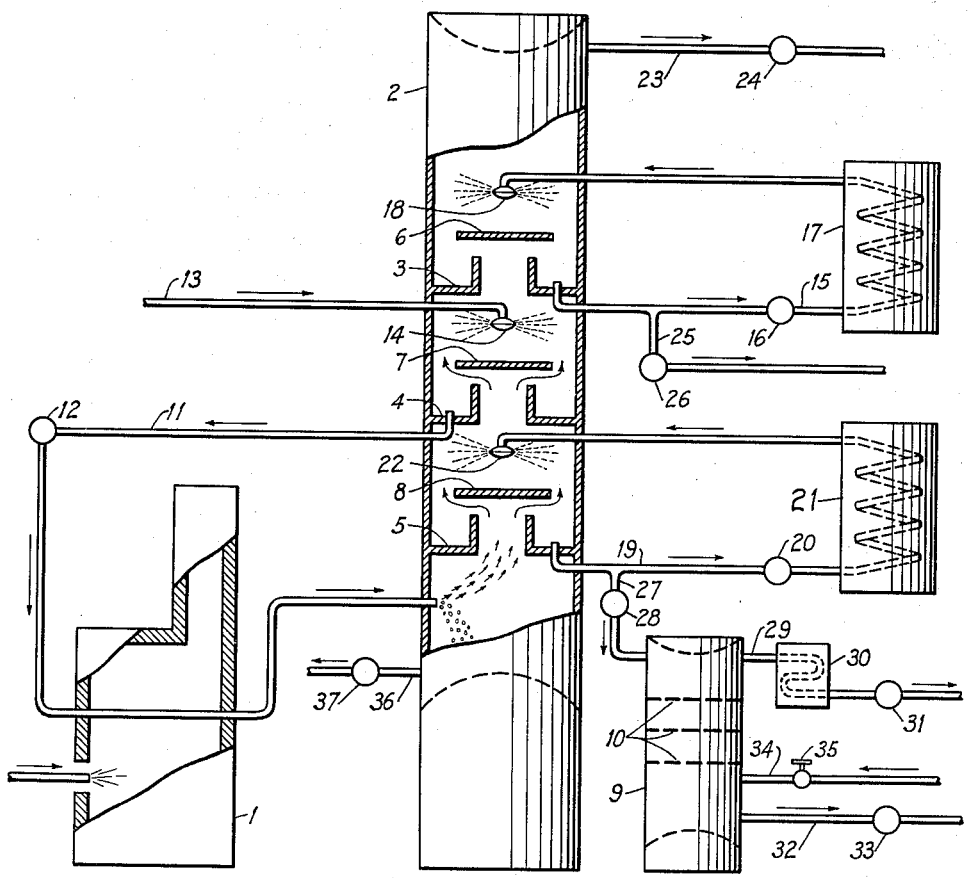
M. P. Youker INVENTOR.

Patented Aug. 2, 1938

2,125,325

UNITED STATES PATENT OFFICE 2,125,325

VACUUM DISTILLATION PROCESS

Malcolm P. Youker, Tulsa, Okla., assignor to Phillips Petroleum Company, Bartlesville, Okla., a corporation of Delaware Application February 25, 1930, Serial No. 431,291

10 Claims. (Cl. 196—77)

My new process relates particularly to the distillation of heavy comparatively non-volatile hydrocarbon liquids to separate therefrom tars and asphalts and other impurties thereby producing a heavy non-volatile distillate which may be advantageously used for the manufacturing of lubricating oils or for charging stock to high pressure stills in the manufacturing of cracked gasoline. The principal advantage of my new process is that tar and asphalt and other impurities may be thereby removed from heavy non-volatile oils. However, there are other advantages to this process which will be made apparent.

My new process will be more fully understood from the following description taken in connection with the accompanying drawing which illustrates diagrammatically in side elevation a form of apparatus by which my new process may be carried out.

Referring to the drawing, the numeral 1 designates a furnace, the numeral 2 designates a vertical cylindrical closed vessel capable of standing high vacuum. Circular plates 3, 4, and 5 are horizontally disposed in vessel 2. A circular orifice is cut through the center of each of plates 3, 4, and 5 and the edge of each of these plates is turned upward around the edge of this orifice. Circular plates 6, 7, and 8 are horizontally disposed above the orifices in plates 3, 4, and 5 respectively. The numeral 9 designates a fractionating column in which bubble trays 10 are disposed. A pipe line 11 in which is mounted a pump 12 leads from plate 4 through the furnace 1 into the cylindrical vessel 2 at a point below plate 5. A pipe line 13 leads to a spray head 14 which is mounted in vessel 2 above plate 7 and below plate 3. A pipe line 15 in which is mounted a pump 16 leads from plate 3 in vessel 2 through a cooler 17 to a spray head 18 which is mounted in vessel 2 above plate 6. A pipe line 19 in which is mounted a pump 20 leads from plate 5 in vessel 2 through a cooler 21 to a spray head 22 which is mounted in vessel 2 above plate 8 and below plate 4. A pipe line 23 leads from the top of vessel 2 through a vacuum pump 24. A pipe line 25 in which is mounted a pump 26 leads from pipe line 15. A pipe line 27 in which is mounted a pump 28 leads from pipe line 19 into the top of fractionating column 9. A pipe line 29 leads from the top of fractionating column 9 through a condenser 30 to a wet vacuum pump 31. A pipe line 32 in which is mounted a pump 33 leads from the bottom of fractionating column 9. A pipe line 34 which is in communication with a supply of steam and in which is mounted a valve 35 leads into fractionating column 9 at a point below bubble trays 10. A pipe line 36 in which is mounted a pump 37 leads from the bottom of the vessel 2.

This apparatus will be utilized to carry out my new process in the following manner:

Heavy comparatively non-volatile hydrocarbon liquid such as fuel oil will be charged to the apparatus through pipe line 13 and spray head 14 into vessel 2 and will flow thence downward in vessel 2 and collect on plate 4. Liquid which collects on plate 4 will be forced by means of pump 12 to flow in pipe 11 from plate 4 through the furnace 1 into the bottom of vessel 2. The furnace 1 will be fired to heat the oil which flows through pipe 11. Vapors which are evolved as a result of heating the oil which flows through pipe 11 will flow upward through the vessel 2 by way of orifices in plates 3, 4, and 5. Liquid which flows through pipe 11 into the bottom of vessel 2 and which is not vaporized by heating in pipe 11 will collect in the bottom of vessel 2 and will be pumped therefrom by pump 37 through pipe 36. Before starting the apparatus a quantity of hydrocarbon liquid will be supplied to plates 3 and 5. After being started, liquid will be circulated from plate 5 by pump 20 through pipe line 19 and through cooler 21 through the spray head 22 into the vessel 2 where such sprayed, cooled liquid will contact vapors rising through vessel 2 and condensate which will be precipitated by this sprayed liquid, together with the sprayed liquid, will collect on plate 5. Liquid which will be condensed in vessel 2 and collected on plate 5 will be pumped therefrom through pipes 19 and 27 by means of pump 28 into the top of fractionating column 9 and will flow thence downward through fractionating column 9 over bubble trays 10 to collect at the bottom of fractionating column 9 and will be pumped thence from the bottom of fractionating column 9 through pipe 32 by means of pump 33 as a finished product of the process. Steam will be admitted to the fractionating column 9 by means of valve 35 in pipe 34 and will flow upward through the fractionating column 9 to reboil liquid which flows downward through fractionating column 9. The wet vacuum pump 31 will be operated to withdraw from the top of fractionating column 9 through condenser 30 the mixture of steam and oil vapor which will be produced in fractionating column 9. After the apparatus has been started, liquid will be circulated from plate 3 by means of pump 16 through pipe 15 and cooler 17 to the spray head 18. The cooled liquid thus sprayed through the spray head 18 will condense vapors which rise through vessel 2 and this sprayed liquid, together with condensate, will collect on plate 3. Condensate which collects on plate 3 will be withdrawn therefrom through pipe 15 and 25 by means of pump 26. The liquid charged to the apparatus through the spray head 14 will contact vapors which will rise through the vessel 2 and will condense a part of these vapors and at the same time the liquid thus charged to the apparatus will be heated by the vapors rising through vessel 2. The vacuum pump 24 will be operated to maintain a high vacuum in the vessel 2.

By my new process the charge to the still is prediluted with the lighter constituents of liquid previously charged to the still which will be found to be highly beneficial in that these lighter constituents serve to assist in the subsequent vaporization of the less volatile constituents of the charge to the still. The direct contact condenser shown will be found to be better than worm condensers which are commonly employed in that the friction head opposing the flow of vapors between the point of vaporization and the point of exit from the low pressure zone may be minimized.

I claim:—

1. A process of distilling heavy comparatively non-volatile hydrocarbon liquids to separate therefrom tars and asphalts and other impurities and thereby producing a heavy substantially non-volatile distillate, comprising introducing a charging stock consisting of said heavy comparatively non-volatile hydrocarbon liquid into the medial portion of a fractionating zone containing superposed pools of hydrocarbon liquids, passing hydrocarbon liquid from an intermediate one of said pools through a heating zone, and then reintroducing the same into the fractionating zone under a lower one of said pools and thereby separating the heated liquid into a vaporous fraction and a liquid fraction, discharging the liquid fraction from said fractionating zone, passing said vaporous fraction upwardly in the fractionating zone and first contacting it with a stream of cold condensate derived from said vaporous fraction, and thereby condensing a portion of said vaporous fraction and depositing the condensate in said lower pool, passing the uncondensed portion of the vaporous fraction upwardly in the fractionating zone and bringing the same into contact with the charging stock, and thereby condensing an additional amount of the vaporous fraction and depositing the same in said intermediate pool, maintaining said fractionating zone under sub-atmospheric pressure, and withdrawing vapors from the top of the fractionating zone.

2. A process of distilling heavy comparatively non-volatile hydrocarbon liquids to separate therefrom tars and asphalts and other impurities and thereby producing a heavy substantially non-volatile distillate, comprising introducing a charging stock consisting of said heavy comparatively non-volatile hydrocarbon liquid into the medial portion of a fractionating zone containing superposed pools of hydrocarbon liquids, passing hydrocarbon liquid from an intermediate one of said pools through a heating zone and then reintroducing the same into the fractionating zone under a lower one of said pools and thereby separating the heated liquid into a vaporous fraction and a liquid fraction, discharging the liquid fraction from said fractionating zone, passing said vaporous fraction upwardly in the fractionating zone and first contacting it with a stream of cold condensate derived from said vaporous fraction, and thereby condensing a portion of said vaporous fraction and depositing the condensate in said lower pool, passing the uncondensed portion of the vaporous fraction upwardly in the fractionating zone and bringing the same into contact with the charging stock and thereby condensing an additional amount of the vaporous fraction and depositing the same in said intermediate pool, maintaining said fractionating zone under sub-atmospheric pressure, withdrawing vapors from the top of the fractionating zone, and discharging liquid hydrocarbons from said lower pool and fractionating the last mentioned liquid hydrocarbons.

3. A process of distilling heavy comparatively non-volatile hydrocarbon liquids to separate therefrom tars and asphalts and other impurities and thereby producing a heavy substantially non-volatile distillate, comprising introducing a charging stock consisting of said comparatively heavy non-volatile liquids into the medial portion of a fractionating zone containing superposed pools of liquid hydrocarbons, passing hydrocarbon liquid from an intermediate one of said pools through a heating zone, and then reintroducing the same into the fractionating zone under a lower one of said pools and thereby separating the heated liquid into a vaporous fraction and a liquid fraction, discharging the liquid fraction from said fractionating zone, passing said vaporous fraction upwardly in the fractionating zone and first contacting it with a cool stream of liquid condensate condensed out of said vaporous fraction and thereby condensing a portion of said vaporous fraction and depositing the condensate in said lower pool, passing the uncondensed portion of the vaporous fraction upwardly in the fractionating zone and bringing the same into contact with said charging stock and thereby condensing an additional amount of the vaporous fraction and depositing the same in said intermediate pool, again passing the uncondensed portion of said vaporous fraction upwardly and contacting it with a cool reflux derived from the last mentioned fraction and thereby condensing another portion of said vaporous fraction and depositing it in an upper one of said pools, maintaining said fractionating zone under sub-atmospheric pressure, and withdrawing vapors from the top of the fractionating zone.

4. In the production of lubricating oil distillates by the vacuum distillation of lubricating oil stocks, the process which comprises adding a relatively light diluent oil to a lubricating oil charging stock and passing the mixture through a heating zone in which the oil is heated to a point below the decomposition temperature of the constituents thereof, releasing the heated oil into a vaporizing zone in which substantial portions of the oil are vaporized, passing the vapors evolved from the oil through a series of condensing zones of decreasing temperature through which the vapors pass with substantially no resistance to their flow while preventing return of condensates to the vaporizing zone, rectifying the vapors in each zone by bringing them into intimate contact with a spray of condensate mechanically projected from a pool of condensate maintained in each zone, passing vapors remaining uncondensed in the zone of lowest temperature into a final condensing zone, and maintaining a substantially uniform high vacuum on the oil and vapors in the vaporizing and condensing zones.

5. A distillation process for separating asphalt from lubricating distillates, which comprises prediluting a hydrocarbon liquid consisting of a mixture of asphalt and lubricating distillates, by contacting said liquid with the vapors of a lighter portion of said distillates, thereby condensing said lighter portion, passing said prediluted liquid through a heating zone, wherein the said prediluted liquid is heated to a temperature at which no substantial cracking of any of the constituents of said liquid will take place, passing the thus heated liquid to a vaporizing zone maintained under sub-atmospheric pressure, vaporizing therein without rectification all the constituents of the said liquid except asphalt, withdrawing asphalt from the said vaporizing zone, rectifying the vaporized constituents, to obtain lubricating distillates and vapors of the said lighter portion, and condensing vapors of said lighter portion by contact with said liquid and thus accomplishing the aforesaid predilution.

6. The method of separating lubricating oils from asphalt which consists in taking a starting mixture containing lubricating oils and non-volatile asphaltic residuum, adding thereto a diluent oil which is completely vaporizable, continuously subjecting all of the oils to flash vaporization from the asphaltic residuum by first heating the entire mixture in a confined stream under pressure and then releasing the mixture into a vaporizing zone maintained under a sufficient vacuum to vaporize the oils under the contained heat of the mixture, the temperature of heating being insufficient to crack any of the materials, condensing the vapors while preventing return of any condensate to the vaporizing zone, and withdrawing asphaltic residue.

7. The method of separating lubricating oils from asphalt which consists in taking a starting mixture containing lubricating oils and non-volatile asphaltic residuum, adding thereto a diluent oil, continuously subjecting all of the oils to flash vaporization from the asphaltic residuum by first heating the entire mixture in a confined stream under pressure and then releasing the mixture into a vaporizing zone maintained under a sufficient vacuum to vaporize the oils under the contained heat of the mixture, the temperature of heating being insufficient to crack any of the materials, condensing the vapors while preventing return of any condensate to the vaporizing zone, and withdrawing asphaltic residue, said diluent oil being completely vaporizable under the temperature at which flash vaporization takes place.

8. The method of separating lubricating oils from asphalt which consists in taking a starting mixture containing lubricating oils and non-volatile asphaltic residuum, adding thereto a diluent oil which is completely vaporizable, continuously subjecting all of the oils to flash vaporization from the asphaltic residuum by first heating the entire mixture in a confined stream under pressure and then releasing the mixture into a vaporizing zone maintained under a sufficient vacuum to vaporize the oils under the contained heat of the mixture, the temperature of heating being insufficient to crack any of the materials, separately condensing the vapors of the lubricating oils and the diluent while preventing return of any condensate to the vaporizing zone, and withdrawing asphaltic residue.

9. The method of separating lubricating oils from asphalt which consists in taking a starting mixture containing lubricating oils and non-volatile asphaltic residuum, adding thereto a diluent oil, continuously subjecting all of the oils to flash vaporization from the asphaltic residuum by first heating the entire mixture in a confined stream under pressure and then releasing the mixture into a vaporizing zone maintained under a sufficient vacuum to vaporize the oils under the contained heat of the mixture, the temperature of heating being insufficient to crack any of the materials, separately condensing the vapors of the lubricating oils and the diluent while preventing return of any condensate to the vaporizing zone, and withdrawing asphaltic residue, said diluent oil being completely vaporizable under the temperature at which flash vaporization takes place.

10. The method of separating lubricating oils from asphalt which consists in taking a starting mixture containing lubricating oils and non-volatile asphaltic residuum, adding thereto a diluent oil which is completely vaporizable, continuously subjecting all of the oils to flash vaporization from the asphaltic residuum by first heating the entire mixture in a confined stream under pressure and then releasing the mixture into a vaporizing zone maintained under a sufficient vacuum to vaporize the oils under the contained heat of the mixture, the temperature of heating being insufficient to crack any of the materials, condensing a portion of the vapors as they pass upwardly through said zone and thereby forming a pool of lubricating oil condensate, withdrawing lubricating oil from the pool, passing the uncondensed portion of the vapors upwardly in the zone and subsequently condensing the last-mentioned vapors, and withdrawing asphaltic residue from the lowest portion of said zone.

MALCOLM P. YOUKER.